United States Patent [19]

Kunze et al.

[11] 4,125,595
[45] Nov. 14, 1978

[54] PROCESS FOR THE PRODUCTION OF VERY PURE BROMINE

[76] Inventors: Dietmar Kunze, Sülbergstrasse 1; Walter Raschka, Wietföhr 53/54, both of 3202 Bad Salzdetfurth, Germany

[21] Appl. No.: 836,099
[22] Filed: Sep. 23, 1977

[30] Foreign Application Priority Data

Sep. 25, 1976 [DE] Fed. Rep. of Germany ....... 2643280

[51] Int. Cl.² .............................................. C01B 7/10
[52] U.S. Cl. ..................................... 423/500; 423/504
[58] Field of Search ........................ 423/500, 504, 507

[56] References Cited

U.S. PATENT DOCUMENTS

| | | | |
|---|---|---|---|
| 2,359,221 | 9/1944 | Kenaga | 423/500 |
| 3,314,762 | 4/1967 | Hahn | 423/500 |
| 3,959,450 | 5/1976 | Calloue et al. | 423/500 X |
| 4,031,194 | 6/1977 | Ogawa et al. | 423/500 |

FOREIGN PATENT DOCUMENTS 1,705 of 1878 United Kingdom ...................... 423/500

Primary Examiner—Earl C. Thomas

Attorney, Agent, or Firm—Anthony DeLaurentis

[57] ABSTRACT

A process for the production of highly pure bromine from heated bromine-containing solutions. The process is an improvement over prior bromine-extraction methods comprising introducing steam and chlorine countercurrent to heated bromine-containing solution into a bromine column having a reboiler said reboiler having a liquid zone and a gaseous zone, withdrawing a mixture of bromine, chlorine and steam overhead from said bromine column, condensing the mixture of bromine, chlorine and steam withdrawn overhead to form crude bromine and sour water and distilling the crude bromine so formed. The improvement comprises introducing the chlorine gas controlled in dependency on the density of crude bromine into the upper two thirds of the liquid zone in said reboiler, introducing about 40% to about 80% of the theoretically needed steam into the lower third of the liquid zone in said reboiler, and introducing the remainder of the steam regulated in dependence on the bromine-chlorine-steam mixture withdrawn overhead from said bromine column into the gaseous zone of the reboiler or the lower part of the bromine column.

6 Claims, 3 Drawing Figures

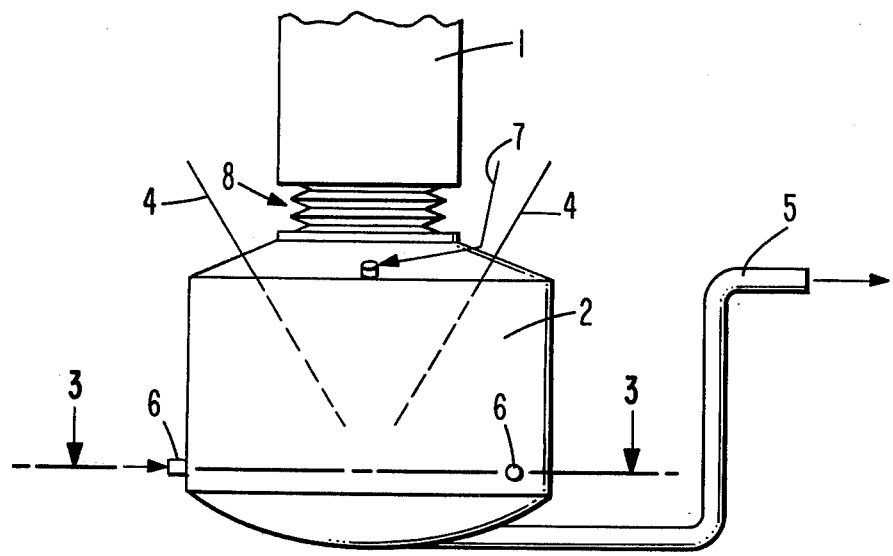
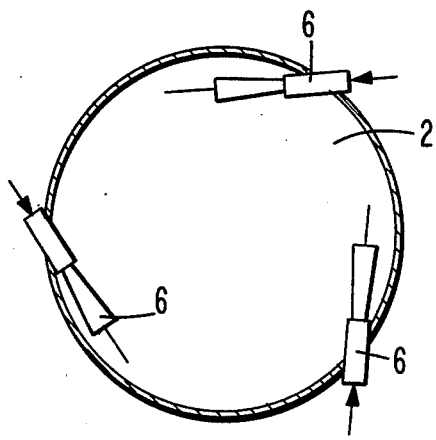

PROCESS FOR THE PRODUCTION OF VERY PURE BROMINE

Bromine is conventionally produced by treating bromide-containing salt solutions, sols, sea water or potassium salt reprocessing liquors with chlorine. The resultant uncombined bromine is then removed from solution by employing the so-called cold debromination process. The process is effected at ambient temperature and the bromine is recovered by absorption in alkalicarbonate or hydroxide solutions or in sulfuric acid. In solutions with high bromine contents, however, the so-called hot debromination process is generally used. In the foregoing process the bromine is liberated by chlorine at elevated temperature, removed from solution utilizing steam, and recovered as condensate by cooling of the bromine-chlorine-steam mixture.

In the case of hot debromination the bromine containing solution to be treated is preheated and introduced into the top of a bromine treatment column. Chlorine is introduced at the bottom of the column. It is also advantageous to introduce steam and chlorine into a reboiler, connected to the bromine column. The mixture of bromine, chlorine and steam, withdrawn as overhead from the bromine column, is condensed and the sour water is separated in a separating flask from the condensate, while the remaining crude bromine is purified by distillation. In regard to this process, the proposal was made in German Pat. No. 2,064,502, to regulate the quantity of the chlorine introduced into the bromine column per time unit by the density of the crude bromine, measured directly after the separating flask, while maintaining the temperature of the bromine-chlorine-steam mixture between about 85°–102° C by control of the volume of steam fed into the bromine column per time unit.

For the production of a very pure, practically residue-free bromine according to this process, the proposal was made in German Pat. No. 2,108,392, to separate the main quantity of water from the bromine-chlorine-steam mixture in a first condensation step at a temperature of 35°–70° C, to separate the bromine from the gas mixture remaining after the first condensation step in a second condensation step at a temperature of 15°–35° C, and to return bromine-containing gas to the bromine column. The liquid phases of the first and second condensation steps are then separated in a separating flask into crude bromine and sour water. The sour water is returned to the bromine column. The crude bromine is subsequently recovered from the residue in a first distillation step, it is then returned by means of a gas to the bromine column whenever the temperature in the distillation sump has risen to above 62.5° C, or whenever the sump bromine has a waste steam residue of 10,000–15,000 ppm. Bromine is condensed from the practically residue-free distillate of the first distillation step and is separated from the bromine-containing chlorine gas which is returned to the bromine column. The bromine of the first distillation step is fed to a second distillatio step via a rectifying column and is heated to a temperature of at least 58.5° C. The bromine-containing chlorine gas, distilling away, is returned to the bromine column, while very pure bromine is drawn from the distillation sump and cooled.

The bromine withdrawn from the distillatio sump contains less than 90 ppm of chlorine and less than 190 ppm of water. According to German Pat. No. 2,136,587 this purity of the bromine, may be further increased, by condensing the distillate of the second distillation step and feeding the condensed distillate to a separating flask. In the separating flask water is separated from the bromine. The bromine, freed of water is then again introduced into the rectifying column of the second distillation step.

Since the previously known processes, however, produce yields of bromine of only 90–95% of theory, it is an objective of this invention to increase the yield of bromine to above 99% of theory.

This and other objects and advantages of the invention will become more fully apparent in view of the following description thereof, taken in conjunction with the drawing, wherein:

FIG. 2 is a front elevational view, with portions removed and broken away for the sake of clarity, of one embodiment of a bromine column and reboiler in accordance with the present invention.

FIG. 3 is a sectional view of the reboiler of FIG. 2, taken along line 3—3 thereof, illustrating the manner in which steam is introduced into the reboiler.

Figure 1:
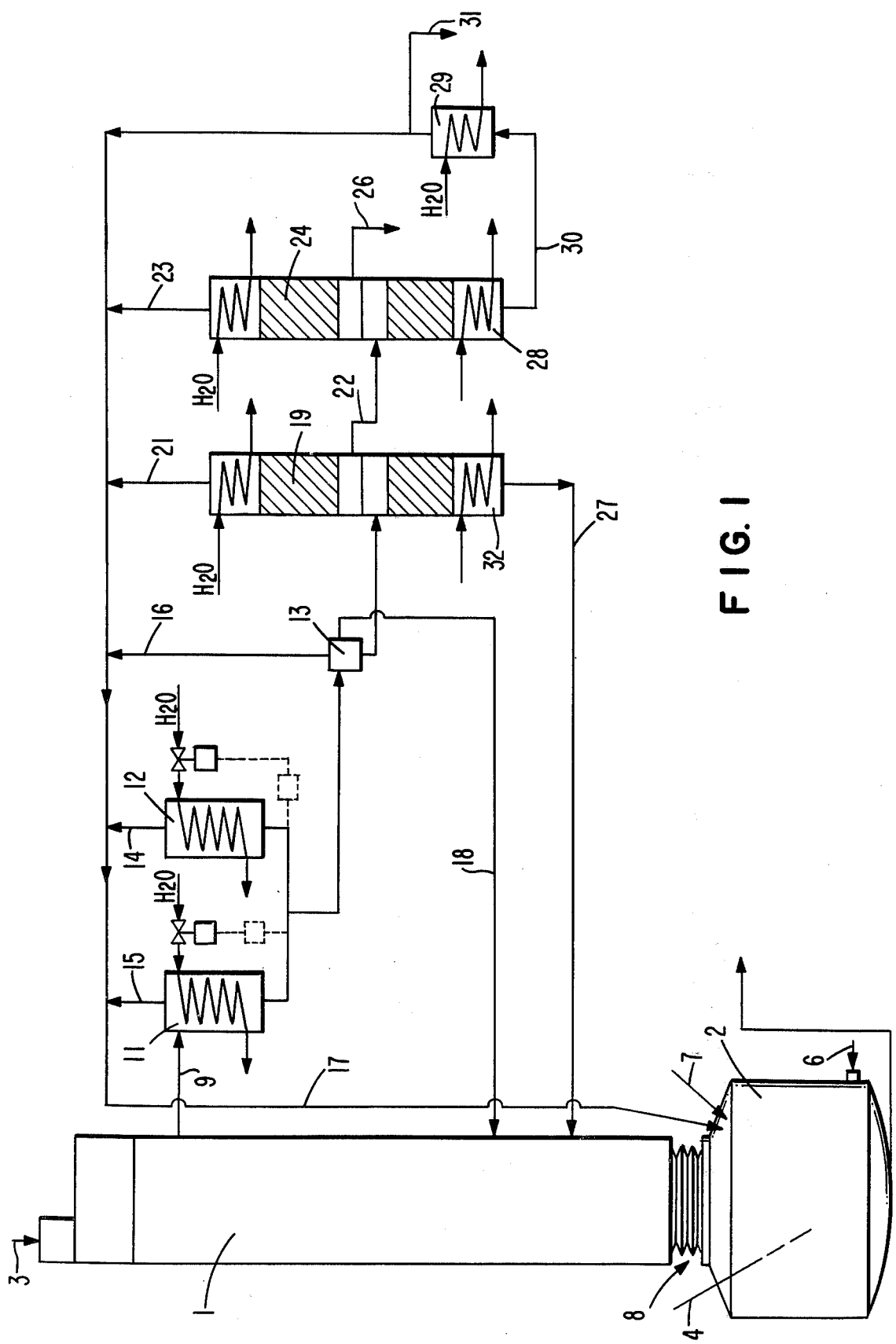
FIG. 1 is a schematic flow sheet illustrating the process of the present invention.

Referring to the drawing, and more particularly to FIG. 1, very pure bromine is produced from bromine-containing feed solutions at elevated temperatures by introducing steam and chlorine counter current to the bromine-containing solutions in a bromine column 1 equipped with a reboiler 2, condensing the bromine-chlorine-stream mixture emerging from the bromine column, and distilling the crude bromine remaining after separation of sour water.

As illustrated, the bromine-containing solution is fed into the bromine column 1 through line 3 and the chlorine gas, the volume of which being controlled in dependence upon the density of the crude bromine, is fed into the upper two thirds of the liquid zone of the reboiler 2 through two perforated lances 4. The lances, which as illustrated most clearly in FIG. 2, may be made of polytetrafluoroethylene or the like and are designed to reach into the upper two thirds of the liquid zone of the reboiler; the liquid level in the reboiler being adjusted by a siphon 5. The steam is fed into the reboiler 2 at two locations; 40–80% of the theoretically required steam being introduced into the lower third of the liquid zone of the reboiler 2 by means of suitably spaced steam inlet nozzles 6 (FIG. 3), and the remaining volume of the steam, controlled in dependence on the temperature of the bromine-chlorine-steam mixture leaving the top of the bromine column, being introduced into the gas-zone of the reboiler or into the lower part of the bromine column by means of a conventional connection through line 7. In a preferred embodiment, the inlet nozzles 6, which may be made of titanium or some other suitable material, are arranged such that the direction of their jets is tangential relative to the sidewalls of the reboiler 2. The reboiler, which may be made of titanium or a titanium-palladium alloy, is preferably connected to the bromine column 1 by means of a bellows 8 of polytetrafluoroethylene, titanium, titabium-palladium or the like.

Any conventional bromine-containing solutions which have been used according to the hitherto knwon processes as starting materials may be used in the process of this invention for bromine production. The process of this invention is particularly suited for the processing of solution containing high bromine contents. These solutions are fed through line 3 into the top of a bromine column 1 equipped with a reboiler 2 and are treated at elevated temperature with steam and chlorine, advantageously, both introduced into the reboiler 2 of the bromine column. A bromine-chlorine-steam mixture is withdrawn at the top of the bromine column through line 9 and is condensed in a conventional manner. The sour water is separated from the condensate, and, preferably is returned into the bromine column 1. The crude bromine obtained thereby is subsequently purified by distillation, whereby pure bromine is obtained as the product, the purity of which corresponds to the distillation measures used.

In the process of this invention, the quantity of the chlorine which is introduced is controlled relative to the density of the crude bromine in a conventional manner. This quantity of chlorine, according to the invention is introduced into the upper two thirds of the liquid zone of the reboiler 2. According to the invention, 40–80% of the theoretically needed steam are introduced into the lower third of the liquid zone of the reboiler. The residual quantity of steam, which is controlled in a conventional manner relative to the temperature of the bromine-chlorine-steam mixture leaving the top of the bromine column, is passed according to the invention into the gas zone of the reboiler or into the lower part of the bromine column.

By introducing a relatively large portion of the steam into the lower third of the liquid zone of the reboiler, the uncombined bromine and chlorine contained in the liquid zone of said reboiler, are largely distilled off from the liquid. This effect of the steam is enhanced whenever the latter is introduced into the liquid zone of the reboiler tangentially, because turbulence is created in the liquid zone. This turbulence facilitates and furthers the emergence of the gaseous halogens. In this way practically complete removal of the halogens from the liquid zone of the reboiler will be achieved.

The yield of bromine may be further improved and increased whenever the excess chlorine is removed overhead from the condensor in which the bromine-chlorine-steam mix, drawn off topside from the bromine column is condensed, and returned to the reboiler. This chlorine, together with the chlorine that is to be introduced into the process, is passed into the upper two thirds of the liquid zone of the reboiler. This return of chlorine offers the advantage of allowing chlorine to be used in excess of the stoichiometrically required amount. From 5% to about 10% chlorine excess chlorine can be used without decreasing yield.

In the most preferred embodiment of this invention the main quantity of water is separated as a liquid phase from the bromine-chlorine-steam mixture withdrawn through line 9 from the top of the bromine column in a first condensor 11. This first condensation step is effected at a temperature of about 35° to about 70° C. Water is also separated as a liquid phase from bromine in a second condensor or condensation step 12 at a temperature of 15° C to 35° C. Bromine-containing chlorine gas obtained by condensation is returned to the reboiler through lines 14–17. In the foregoing embodiment of the invention, the crude bromine is separated from the mixture of the liquid phase of the first and the second condensation step in a separation drum 13 and the sour water remaining after recovery of crude bromine in this manner is returned into the bromine column through line 18. The crude bromine, thus obtained, is distilled in a first distillation step in column 19 to form a bromine-containing chlorine gas (line 21), and an overhead condensate (line 22) containing chlorine and water in addition to bromine. From this condensate, a chlorine gas (line 23) which contains water and bromine is distilled off in a second distillation step in column 24 at a sump temperature of at least 58° C. This chlorine gas which contains water and bromine derived from the second distillation step together with the bromine-containing chlorine gas (line 21) of the first distillation step is returned to the reboiler through line 17, whereas bromine produce is drawn off from the distillation sump 28. The bromine is suitably cooled, for example, by means of cooler 29. In this case it may still be advantageous with a view of the bromine yield, to draw off the distillation residue (line 27) of the first distillation step and return it into the bromine column 1 whenever the temperature of the distillation sump 32 has risen to 62.5° C or whenever the distillation sump has a content of 10,000–15,000 ppm of evaporation residue.

Another aspect of the invention resides in the apparatus for carrying out the process of the invention. The reboiler 2 succeeding the bromine column 1 is made of titanium or titaniumpalladium alloy and has several perforated teflon-lances 4 for the introduction of chlorine gas, in the upper two thirds of the liquid zone.

Steam injection means, preferably a plurality of steam injectors or nozzles 6, made of titanium, are located in the lower third of the liquid zone. The steam injectors are arranged to direct the steam into the reboiler tangentially to the side walls of the reboiler. Steam injection utilizing tangential introduction of steam in the liquid zone of the reboiler by means of steam injectors located in the lower third of the liquid zone of the boiler causes a high order of turbidity in the reboiler.

For hydroextracting the excess chlorine during condensation of the bromine-chlorine-steam mixture a steam injector made of titanium is preferably employed.

The process of the invention offers the advantage that debromination of salt solutions is effected almost quantitatively even where solutions of high initial bromine content are employed. In accordance with the process of this invention, increased bromine yields of almost 99.5% of theory are obtained. Another advantage of this invention is that the salt solutions leaving the reboiler contain very limited quantities of free halogens, preferably less than 5mg/l. As a result, the pH of these salt solutions — measured undiluted — is within one range of 2–5; these salt solution therefore require additions of considerably less neutralizing agent in the case of further processing, then the salt solutions obtained as by-producted in the debromination processes of the prior art. Moreover, since in the process of this invention excess chlorine is returned to the debromination system, 5–15% excess of chlorine may be used instead of the 5% chlorine excess generally employed in bromine distillation according to processes of the prior art. Therefore, in accordance with the process of this invention, debromination may be carried out quantitatively. Dispite the introduction of a large proportion of the steam into the liquid zone of the boiler, the remaining quantity of the steam still suffices to control the temperature of the bromine-chlorine-steam mixture departing topside from the bromine column and to maintain the temperature within the preferred range of between 90° and 100° C.

By using the previously described apparatus of the invention it will be possible to achieve bromine yields of 99.5 and more percent of theory with the process of the invention. The bromine obtained as product, is of outstanding quality.

The process of the present invention may be more fully appreciated when viewed in connection with the drawing and the following example wherein:

EXAMPLE

Fifty cubic meters of a salt solution containing 5.3g/L of bromine, preheated to 94° C is fed through line 3 into the top of a bromine column 1 (NW 1000). Crude bromine density is adjusted at 2.93 g/cm$^3$. Fifteen kilograms of chlorine, removed from the condensors 11 and 12 during the condensation of the bromine-chlorine-steam mixture withdrawn from the bromine column, and an additional 130 kg of chlorine are injected into the upper two thirds of the liquid zone of the bromine column reboiler 2. Introduction is effected by means of two perforated Teflon lances 4. The exit temperature of the bromine-chlorine-steam mixture from the bromine column 1 is maintained at 98° C, and 285 kg of steam are used for the complete driving off of bromine and chlorine. Of the 285 kg of steam employed, 200 kg are introduced by means of three tangentially directed titanium steam injectors 6 into the lower part of the reboiler 2, and 85 kg are introduced into the upper part of the reboiler.

The salt solution (50.3m$^3$) is removed from the reboiler 2 at a temperature of 122° C and has a pH value of 3.3, measured undiluted. This salt solution removed from the reboiler 2 contains only 20 mg/1 of bromine ion and 5 mg/1 of free halogen. The bromine yield amounts to 99.6% of theory.

Thus, the process of the invention is characterized by the combination of the following measures:

(a) From the bromine-chlorine-steam mixture distilled overhead from the bromine column 1, the main quantity of the water is separated at a temperature of 35°–70° C in a first condensor 11 as a liquid phase, bromine is separated as liquid phase at a temperature of 15°–35° C in a second condensor 12, and the bromine-containing chlorine gas is returned into the reboiler 2;

(b) The raw bromine is separated from the mixture of the liquid phase of the first and second condensors 11 and 12, respectively in a separating drum 13 and the remaining sour water is returned to the bromine column 1; and (c) A bromine-containing chlorine gas (line 21) and an overhead condensate (line 22), containing beside bromine also chlorine and water, is obtained from the raw bromine in a first distillation column 19, from which condensate a chlorine gas (line 23) containing bromine and water is distilled from a second distillation column 24 at a sump temperature of at least 58.5° C, and is fed together with the bromine-containing chlorine gas (line 21) of the first distillation column 19 to the reboiler 2, while the bromine obtained from the distillation sump 28 of distillation column 24 is cooled in a conventional cooler 29 and collected as product 31.

Furthermore, the distillation residue drawn off from the sump 32 of the first distillation column 19 is returned to the bromine column through line 27.

What is claimed is:

1. In a process for the production of bromine containing less than 90 ppm of chlorine and less than 190 ppm of water and in yields above 99% of theory from heated bromine-containing solution into a bromine column having a reboiler said reboiler having a liquid zone and a gaseous zone, withdrawing a mixture of bromine, chlorine and steam overhead from said bromine column, condensing the mixture of bromine, chlorine and steam withdrawn overhead to form cruse bromine and sour water and distilling the crude bromine so formed, the improvement which comprises:

(a) introducing the chlorine gas into the upper two thirds of the liquie zone in said reboiler, the amount of chlorine gas introduced being controlled as a function of the density of the crude bromine;

(b) introducing about 40% to about 80% of the theoretically needed steam into the lower third of the liquid zone in said reboiler; and, (c) introducing the remainder of the theoretically needed amount of steam into the gaseous zone of the reboiler or the lower part of the bromine column, the amount of steam introduced being controlled as a function of the temperature of the bromine-chlorine-steam mixture which is withdrawn overhead from the bromine column.

2. The process of claim 1 further characterized in that the formation of crude bromine and sour water is effected by:

(a) separating, in a first condensation step, the bromine-chlorine-steam mixture withdrawn as overhead from the bromine column to form a liquid phase comprising bromine and a major portion of the water in the bromine-chlorine steam mixture and a gaseous phase comprising bromine, said first condensation being effected at a temperature range of from about 35° C to about 70° C;

(b) separating, in a second condensation step, the gaseous phase formed in said first condensation step to form a liquid phase comprising bromine and a gaseous phase comprising bromine-containing chlorine gas, said second condensation being effected at about 15° C to about 35° C;

(c) returning the bromine-containing chlorine gas from said second condensation step to the reboiler;

(d) combining the liquid phases from the first and second condensation steps to form a third liquid phase comprising crude bromine and sour water;

and recovery of very pure bromine from said crude bromine is effected by:

(e) distilling the crude bromine to form an overhead condensate comprising bromine, chlorine and water, and overhead bromine-containing gas and a distillation residue in a first distillation step;

(f) distilling the condensate from the first distillation step in a second distillation step to form bromine and water containing chlorine gas, said distillation being effected at a sump temperature of at least 62.5° C;

(g) returning the overhead bromine-containing gas from the first distillation step and the water-containing chlorine gas from the second distillation step to the reboiler; and, (h) recovering bromine product from said second distillation step.

3. The process of claim 2 further characterized in that the sour water of step (d) is returned to the bromine column.

4. The process of claim 1, further characterized in that the steam is blown tangentially into the liquid zone of the reboiler.

5. The process as in claim 1, further characterized in that excess chlorine is removed from the condensation of the bromine-chlorine-steam mixture and returned to the reboiler.

6. The process as in claim 3, further characterized in that a 5–15% excess beyond the stoichiometrically required quantity of chlorine to replace combined bromine is used.

* * * * *